United States Patent [19]
Fujita et al.

[11] Patent Number: 5,272,326
[45] Date of Patent: Dec. 21, 1993

[54] OPTICAL CARD HAVING LIGHT ABSORBING LAYER

[75] Inventors: Minoru Fujita; Yoichi Fukushima, both of Tokyo, Japan

[73] Assignee: Kyodo Printing Co., Ltd., Tokyo, Japan

[21] Appl. No.: 976,657

[22] Filed: Nov. 16, 1992

Related U.S. Application Data

[63] Continuation of Ser. No. 427,105, Sep. 26, 1989, abandoned.

[30] Foreign Application Priority Data

Jun. 21, 1988 [JP] Japan ................................ 63-152530

[51] Int. Cl.⁵ ............................................. G06F 19/00
[52] U.S. Cl. ..................................... 235/487; 235/488; 369/275.5
[58] Field of Search .............. 235/487, 488; 346/76 L; 369/275.5, 283

[56] References Cited

U.S. PATENT DOCUMENTS

| | | | |
|---|---|---|---|
| 4,683,371 | 7/1987 | Drexler | 235/487 |
| 4,694,148 | 9/1987 | Diekemper et al. | 235/488 X |
| 4,754,128 | 6/1988 | Takeda et al. | 235/488 |

FOREIGN PATENT DOCUMENTS 58-11196  1/1983  Japan .
63-7537   1/1988  Japan .

Primary Examiner—John Shepperd
Attorney, Agent, or Firm—Kane, Dalsimer, Sullivan, Kurucz, Levy, Eisele & Richard

[57] ABSTRACT

A technique of optical card having high information recording density. In the optical cards, there are two types of optical cards having a read-only optical card and an additional recording optical card. Conventionally, separate readers for reproduction have been used due to difference in light reflectivity. In this invention, a light-absorbing layer (50) having light absorbing ability with respect to reading light (300) is arranged between a card side upon which the reading light is incident and a reflective surface of a pattern (21) of an optical data recording section (20), so that the optical cards have interchangeability therebetween in reading.

12 Claims, 3 Drawing Sheets

OPTICAL CARD HAVING LIGHT ABSORBING LAYER

This is a continuation of copending application Ser. No. 07/427,105 filed on Sep. 26, 1989 now abandoned.

TECHNICAL FIELD

This invention relates to optical cards or optical recording cards in which information recorded in the cards is read out optically and, particularly, to an optical card provided with a light-absorbing layer having light absorbability with respect to reading light, which is arranged between a card side upon which the reading light is incident and a reflecting surface of an optical data recording strips or section.

BACKGROUND ART

Generally, an optical card has very high information recording density, as compared with other recording cards such as a magnetic card, an IC card and so on. The optical card has an optical data recording section on one side of a card substrate. Data is recorded on the optical data recording section by optical energy, chiefly, a laser beam. The recorded information is optically reproduced due to a difference in light reflectivity between the recorded portion and the non-recorded portion.

The general background of such optical card is disclosed in, for example, U.S. Pat. Nos. 4,680,460 and 4,673,626. In the conventional optical card, the optical data recording section is formed by one of various materials such as a low melting-point metal such as tellurium, bismuth or the like, silver chloride photographic material, a metal having high reflectivity such as aluminum, and so on.

By the way, the optical cards are divided broadly into two categories. One of them is a read-only optical card, that is, a ROM (Read Only Memory) optical card in which a user performs only reading. The other is an additional recording optical card, that is, a so-called WO (Write Once) optical card in which the user performs also writing. With respect to the reading, it is preferable that the optical data recording section in the optical card has high light reflectivity. Accordingly, in the ROM optical card, metals of high reflectivity such as aluminum and so on are used, to form a pattern forming material of on the optical data recording section. In this connection, in such ROM optical card, the pattern forming material generally presents a silver color and, accordingly, the design and appearance of the card tends to be monotone. For this purpose, Japanese Patent Provisional Publication Number SHO 62-298036 has proposed a technique in which a light colored layer is provided at a location adjacent the optical data recording section to enhance the design.

On the other hand, in the WO optical card, while performing reading, also requires consideration of the writing characteristic. For this reason, in the WO card, material issued which has light reflectivity of 40%, 50% or the like, normally, 35%~55%. In this connection, U.S. Pat. No. 4,230,939 discloses a technique in which, when the optical data recording section is made of material having relatively high reflectivity such as bismuth, aluminum or the like, an absorption layer containing dyes is provided on the optical data recording section in order to reduce writing energy due to the laser beam.

As described above, generally, since different pattern forming materials are used in the ROM optical card and the WO optical card there is considerable difference in light reflectivity between the pattern forming materials. An optical card such as an ROM card which uses a metal having high reflectivity such as aluminum, its alloy or the like as the forming material of the pattern, requires an expensive special purpose machine for reading the card. The ROM optical card can be produced in large quantity by an etching technique or the like which employs a photo mask, so that an attempt can be made to reduce the cost. In contradistinction thereto, it has been considered that a problem of the read-only special purpose machine forms a serious obstacle in the spread and acceptance of the card. In this connection, in case of both the WO optical cards, or in case of both the ROM cards, it is difficult to use a common reader, if the two cards are considerably different in light reflectivity, for example, if the light reflectivity exceeds 10%.

It is not known in the art to have optical cards each having a respective light reflectivity caused to coincide per se with each other. In any of the aforementioned Japanese Patent Provisional Publication Number SHO 62-298036 and U.S. Pat. No. 4,230,939, the technique is disclosed in which the colored layer or the absorbing layer is provided in the front side of the light reflecting surface, but no way of thinking is disclosed in which the light reflectivities, especially, the light reflectivities with respect to the reading light are made substantially equal to each other.

SUMMARY OF THE INVENTION

It is an object of the invention to provide a technique for optical cards having different respective light reflectivities which are caused to have light reflectivities that coincide with each other in the cards per se so that the cards can be used interchangeably.

It is another object of this invention to provide a ROM optical card capable of being read by a reader for a WO optical card having relatively low light reflectivity.

This invention can be applied broadly to optical cards having various cross-sectional constructions. Typical optical cards have a two-layer construction as shown in FIG. 1, and a single-layer construction as shown in FIG. 2. This invention can be applied to any of these cards. Further, the invention can be applied to an optical card having another known construction, for example, a three-layer construction in which an optical data recording section is formed on a flexible thin sheet, and is sandwiched between two card substrates.

DETAILED DESCRIPTION OF THE PREFERRED EMBODIMENTS

Figure 1:
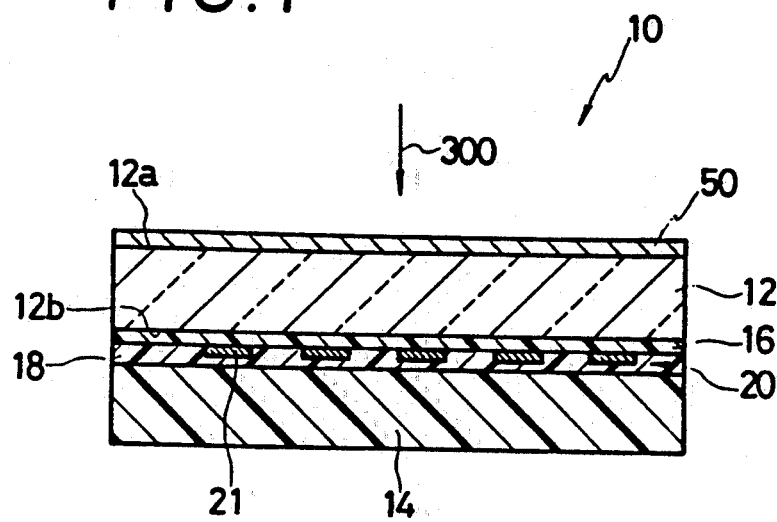
FIG. 1 is a cross-sectional view of a first embodiment of an optical card according to the invention.

In an optical card 10 of a two-layer construction, a transparent protective substrate 12 and a lined support substrate 14 impart rigidity as the card, and there is an optical data recording section 20 between the protective substrate 12 and the support substrate 14. Further, in an optical card 100 of a single-layer construction, a transparent protective substrate 120 gives rigidity as the card, and an optical data recording section 200 is formed on one side of the protective substrate 120. In either card 10 or 100, the protective substrate 12 or 120 has a first side 12a or 120a and a second side 12b or 120b which are parallel to each other. The first side 12a or 120a of both sides of the protective substrate 12 or 120 is the reading side upon which reading light 300 is incident. The optical data recording section 20 or 200 is arranged on the side of the opposite second side 12b or 120b. The optical card 10 of the two-layer construction comprises the protective substrate 12 on the side upon which the reading light 300 is incident, an anchor layer 16 for increasing adhesion of the metal with respect to the protective substrate 12, a metal pattern 21 that is the subject of the optical data recording section 20, an adhesive layer 18 for bonding the side of the protective substrate 12 and the side of the support substrate 14 to each other, and the support substrate 14. Further, the optical card 100 of the single-layer construction comprises an anchor layer 160 on the second side 120b of the protective substrate 120 and a metal pattern 210 on the anchor layer 160. The anchor layer 160 and the metal pattern 210 is coated with a protective layer 190 due to the coating.

The metal pattern 21 or 210 in the optical data recording section 20 or 200 contains the contents of the recorded information, in addition to a pre-format. The pre-format is a pattern which has interchangeability to the format of the WO optical card. This metal pattern 21 or 210 can be obtained such that a thin film of a metal or its alloy having high reflectivity is formed on the anchor layer 16 or 160 and, subsequently, the thin film is selectively etched by the use of a known photo etching technique. As the material of the metal pattern 21 or 210, Al, Cu, Ag, Ni, Cr, Zn, Sn, Ti, Si, Sb, Ge, Fe, Co, Au or the like can be used, but Al is particularly preferable. The reason for this is that Al is easy in formation of a thin film and in etching, is less in a change with the age, and is low in cost. A thickness of the film of the metal pattern 21 or 210 is equal to or less than 1 $\mu$m, preferably, 100 Å ~ 0.1 $\mu$m.

The transparent protective substrate 12 or 120 is of the order of 300 ~ 400 $\mu$m in thickness, for example, and has its rigidity in which the protective substrate 12 or 120 can be handled independently. As the protective substrate 12 or 120, various materials or substrates for a card can be used, but, particularly, a material is suitable which is high in physical strength and which is superior in transparency and smoothness in surface. As the material of the protective substrate 12 or 120, various resins can be used such as polycarbonate, polyethylene terephthalate, epoxy, polymethyl methacrylate, polyvinyl chloride, polyimide, polysulfone, polyether sulfone, polyether ketone, polyether ether ketone or the like.

Further, the support substrate 14 corresponds to the protective substrate 12 or 120, but transparency is not necessarily required for the support substrate 14. As the support substrate 14, resin can be used such as polycarbonate, polyethylene terephthalate, polymethyl methacrylate, polyvinyl chloride or the like. As the adhesive layer 18, various adhesives can be used such as ultraviolet hardening type, thermoplastic, thermosetting, or two-part adhesive, and so on. A thickness of the adhesive layer 18 is of the order of a few microns, for example.

Figure 5:
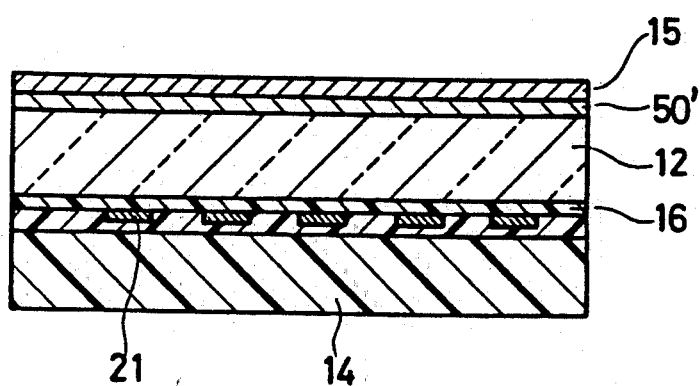
FIG. 5 is a cross-sectional view of a third embodiment of an optical card according to the invention.
Figure 6:
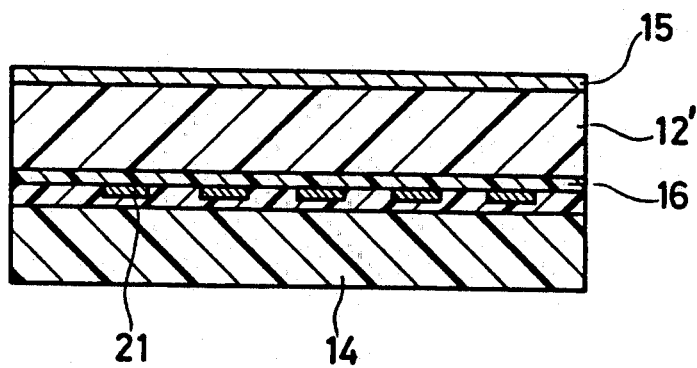
FIG. 6 is a cross-sectional view of a fourth embodiment of an optical card according to the invention.

In this invention, a specific light-absorbing layer 50 or 500 for absorbing the reading light 300 is provided [between] on the first side 12a or 120a of the protective substrate 12 or 120. [and the optical data recording section 20 or 200.] However, as shown in FIGS. 5 and 6 the light absorbing layer need not be specific and need not be on the substrate. The optical card may possess a specific light absorbing layer on the protective substrate. Each optical card 10 or 100 is a ROM optical card, and the light reflectivity due to the metal pattern 21 or 210 is very high, for example, 80%. In this case, the surface reflectivity of the metal pattern 21 per se is 90%, for example, but the effective light reflectivity with respect to the reading in consideration of the protective substrate 12 or 120 is of the order of 80%. The light-absorbing layer 50 or 500 has a function in which such high light reflectivity is made substantially the same as a light reflectivity of 40% in a WO optical card, for example.

Normally, the light-absorbing layer 50 or 500 is formed due to coating by the use of a binder consisting of resin, a dye or pigment absorbing the reading light 300, and a paint made of solvent. As the reading light 300, generally, used is a light within a near-infrared range, for example, a semiconductor laser beam of 780 nm or 830 nm. In contradistinction thereto, as the dye or the pigment having light absorbability, there is a dye such as cyanine, phthalocyanine, methine, merocyanine, aminium, diimonium, transient-metal chelate compound, naphthoquinone, squarilium, azulenium, anthraquinone, chloconium or the like, and a pigment such as carbon black, phthalocyanine or the like. Of these, as the cyanine dye, there are many materials which have strong absorbing ranges in a near-infrared range. In case of such cyanine dye, a small quantity of dye required will suffice and, further, the cyanine dye is superior in uniformity because it is easy to be solved in solvent.

Specific product names will be described below. As a dye, there are PA-1005 and PA-1006 (Mitsui Toatsu Chemicals, Inc.) which are transient-metal chelate compound and are green in color, IR-750 (Nippon Kayaku Co., Ltd.) which is anthraquinone and is green in color, IR-820 (Nippon Kayaku Co., Ltd.) which is polymethenyl and is blue in color, IRG-002 and IRG-003 (Nippon Kayaku Co., Ltd.) which are aminium and are green in color, IRG-022 and IRG-023 (Nippon Kayaku Co., Ltd.) which are diimonium and are green in color, CY-2, CY-4, CY-9 and CY-20 (Nippon Kayaku Co., Ltd.) which are cyanine and are blue in color, NK-125, NK-2014 and NK-2865 (Nippon Kankoh-Shikiso Kenkyusho Co., Ltd.) which are cyanine and cover blue to green in color, and so on. Further, as a pigment, there are carbon black pigments such as channel black, oil furnace black, thermal black and so on. In this connection, these pigments are black in color, and all the dyes are dark in color.

Furthermore, as a resin for use in the light-absorbing layer 50 or 500, various types of resins can be used which are less turbid and which are superior in coating ability. For instance, a resin of acrylate, vinyl, cellulose, polyester, polyurethane, epoxy, alkyd, amino, silicone or the like can be used. Alternatively, a resin can be used in which the above resins are blended.

It is to be noted here that factors controlling the light-absorbing characteristic of the light-absorbing layer 50 or 500 include a thickness of the film, and an amount of mixing or a ratio of mixing of the dye and the pigment.

Figure 3:
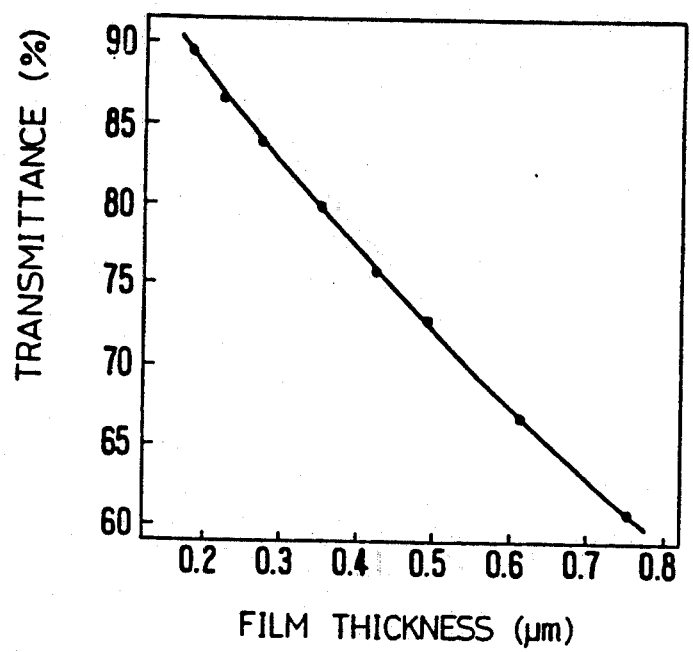
FIG. 3 is a characteristic view showing a relationship between a film thickness and transmittance.
Figure 4:
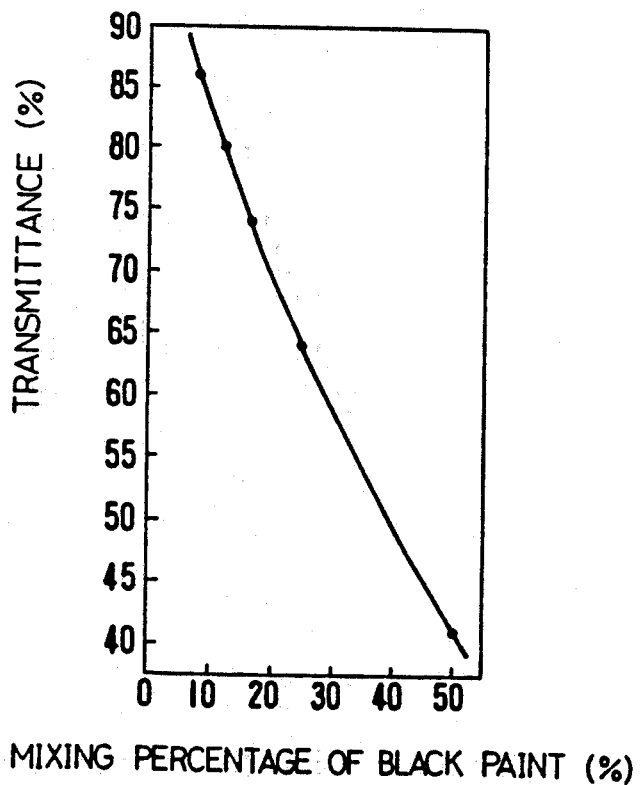
FIG. 4 is a characteristic view showing a relationship between a mixing ratio and the transmittance.

FIG. 3 is a view of one characteristic showing relationship between the film thickness and the transmittance, and FIG. 4 is a view of one characteristic showing a relationship between the mixing ratio of the dye and the pigment and the transmittance at the time the film thickness is constant. From these figures, it will be understood that the light-absorbing characteristic of the light-absorbing layer 50 or 500 can be set by the control of either one of the film thickness and the mixing ratio. In this connection, it is possible to enhance light resistance of the light-absorbing layer 50 or 500 by addition of ultraviolet sorbent, antioxidant or the like into the material.

In the optical card 10 or 100 constructed as above, the reading light 300 is incident upon the first side 12a or 120a of the protective substrate 12 or 120, and reaches the optical data recording section 20 or 200 through the light-absorbing layer 50 or 500 and the transparent protective substrate 12 or 120. In the optical data recording section 20 or 200, a portion of the metal pattern 21 or 210 forms a high reflective portion, and a portion having no metal pattern 21 or 210 forms a low reflective portion. The incident reading light 300 is reflected by either reflecting surface and is returned to the reader. At this time, the incident light and the reflecting light are both absorbed their respective predetermined amounts by the light-absorbing layer 50 or 500. Accordingly, the reading light returned to the reader is the same as that in which the reflectivity due to the metal pattern 21 or 210 is of the order of substantially 40%, for example. For this reason, it is possible to effectively read the ROM optical card 10 or 100 by the reader for the WO optical card.

Figure 2:
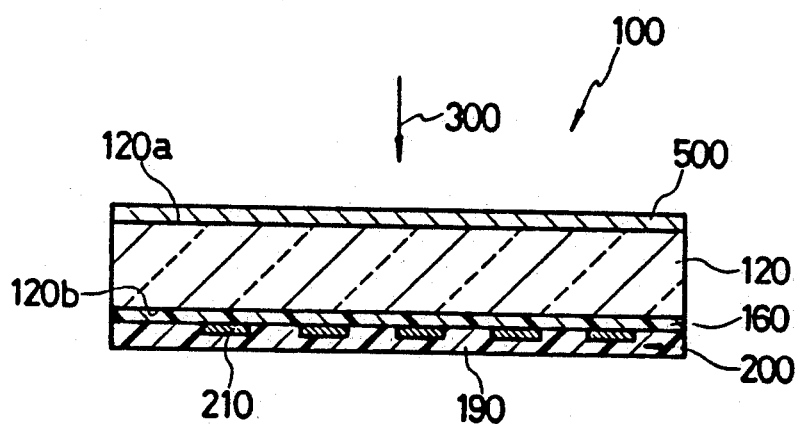
FIG. 2 is a cross-sectional view of a second embodiment of an optical card according to the invention.

The light-absorbing layer should be arranged on the first side 12a or 120a of the protective substrate 12 or 120 and the optical data recording section 20 or 200. As shown in FIGS. 1 and 2, for instance, the light-absorbing layer 50 or 500 may be used also as a surface hardening layer. In addition, as shown in FIG. 5, a light-absorbing layer 50' may be arranged beneath a surface hardening layer 15 in order to prevent contamination or defects from occurring on the surface, or as shown in FIG. 6, a protective substrate 12' per se may be used also as a light-absorbing layer. In the card shown in FIG. 6, when the protective substrate 12' is formed, the previously mentioned dye and pigment are kneaded in the forming material. Further, it is possible to mix the dye and the pigment into an anchor layer 16. In case where the light-absorbing layer is arranged adjacent the metal pattern 21 or 210, however, there is a fear that nonuniformity in the light-absorbing layer causes a problem to occur in nonuniformity in the light absorbing ability or interference of the light. In view of this, it is preferable that the light-absorbing layer is arranged at a position remote from the metal pattern 21 or 210.

It should be understood by the skilled artisan that he optical cards described herein can have light absorbing abilities that coincide substantially with the light absorbing abilities of a second optical card. Both the optical cards described herein and the second optical card can be read-only optical cards, or it may be that the optical card of the invention and the second optical card are each additional recording optical cards.

Best Mode for Carrying Out the Invention

Example 1:

The ROM optical card 10 of the construction shown in FIG. 1 was manufactured through the following steps, with aluminum as a pattern forming material. In the ROM optical card 10 obtained, the light reflectivity of the high reflective portion of the aluminum pattern 21 was 39.5% at the wavelength of 830 nm, and the light reflectivity of the low reflective portion having no pattern 21 was 4.2%. Thus, it was possible to effectively read the recorded information in the optical card 10 by the use of a reader for a WO optical card.

(a) Formation of Anchor Layer 16:

A paint was prepared in which the paint had the following composition, and was sufficiently steered and uniformized. Further, the protective layer 12 made of polycarbonate having a thickness of 0.4 mm was prepared.

Silicone-acrylate resin paint 1161 (Dainippon Ink & Chemicals, Incorporated) having a solid body of 20%: 200 weight parts.
Ethyl cellosolve: 112.5 weight parts,
Cellosolve acetate: 112.5 weight parts, and
Hardening agent for silicone-acrylate resin paint 1161: 25 weight parts.

The prepared paint was dropped onto one side of the protective substrate 12, was spin-coated at 2000 rpm for 30 seconds, and was baked at 120° C. for 60 minutes, thereby forming the anchor layer 16 of about 0.5 μm in thickness.

(b) Formation of Pattern 21:

An aluminum film of 1000 Å in thickness was formed on the anchor layer 16 by vapor deposition and, subsequently, was patterned by the known photo etching technique, thereby forming the predetermined pattern 21.

(c) Formation of Light-Absorbing Layer 50

A paint is prepared in which the paint has the following composition, and is sufficiently steered and uniformized.

Acrylate lacquer containing toluene, butanol and cellosolve as solvent in which their volume ratio of 1 : 1 : 1, and having a solid body of 20%: 10 g, and
Dye liquid in which 15 mg of near-infrared absorbing dye IR-820 (Nippon Kayaku Co., Ltd.) is dissolved by 4 g of solvent containing 1,2-dichloroethane and cyclohexanone at the weight ratio of 1 : 1.

This paint was spin-coated at 2000 rpm for 60 seconds and, subsequently, was dried at 100° C. for 60 minutes. The thus obtained light-absorbing layer 50' had its transmittance of about 70% at the wavelength of 830 nm.

(d) Application of Support Substrate 14

The support substrate 14 consisting of a vinyl chloride sheet of 0.35 mm in thickness was applied, through the adhesive layer 18, to the side of the protective substrate 12 on which the pattern 21 was formed. The support substrate 16 has beforehand been subject to a design due to printing or the like. As a material of the adhesive layer 18, thermoplastic polyester or polyurethane adhesive was effective for the vinyl chloride sheet. The adhesion was effected by a heat press. The heat press was performed at 100° C. and 20 Kg/cm² for 10 minutes. Subsequently, the adhesion was cooled by water for one minute.

(e) Die Cutting (Punching) of Card

Subsequently, die cutting was made into the form of a card, to complete the optical card 10 of pocket size.

Example 2:

In the aforesaid example 1, the pattern 21 of the optical data recording section 20 was formed and, subsequently, the light-absorbing layer 50 was formed. In the example 2, the order was reversed, and a ROM optical card of a construction illustrated in FIG. 5 was manufactured through the following steps.

(a)' Formation of Light-Absorbing Layer 50'

The protective substrate 12 was prepared, which was made of polycarbonate having a smooth surface and having 0.4 mm in thickness. A black paint having the following composition, and sufficiently steered and uniformized was prepared.

- Silicone-acrylate resin paint 1161 (Dainippon Ink & Chemicals, Incorporated) having a solid body of 45%: 40 weight parts,
- Cellosolve acetate: 24 weight parts,
- Vinyl chloride powder in which carbon black was dispersed 30%: 3.6 weight parts,
- Xylene: 16.2 weight parts,
- Cyclohexanone: 16.2 weight parts,
- Ethyl cellosolve: 20 weight parts, and
- Hardening agent for the silicone-acrylate resin paint 1161: 11.1 weight parts.

This black paint was dropped onto the protective substrate 12, was spin-coated at 2000 rpm for 30 seconds and, subsequently, was baked at 120° C. for about one hour. The thus obtained light-absorbing layer 50' revealed transmittance of about 66% inclusive of the protective substrate 12, at the wavelength of 830 nm.

(b) Formation of Surface Hardening Layer 15

The following materials were mixed with each other, and were sufficiently steered to prepare a paint:

- Silicone-acrylate resin paint 1161 (Dainippon Ink & Chemicals, Incorporated) having a solid body of 45%: 40 weight parts,
- Ethyl cellosolve: 25 weight parts,
- Butanol: 15 weight parts,
- Cellosolve acetate: 25 weight parts, and
- Hardening agent for the resin paint 1161: 15.6 weight parts.

The paint was dropped onto the light-absorbing layer 50', was spin-coated at 700 rpm for 30 seconds and, subsequently, was baked at 120° C. for about one hour, thereby forming the surface hardening layer 15 having about 3 μm in thickness.

(c) Formation of Anchor Layer 16

A paint having the following composition was prepared. The paint was spin-coated on the opposite side of the surface hardening layer 15 at 2000 rpm for 30 seconds and, subsequently, was baked at 120° C. for about one hour. Thus, the anchor layer 16 formed which was 0.5 μm in thickness.

- Silicone-acrylate resin paint 1161 (Dainippon Ink & Chemicals, Incorporated) having a solid body of 45%:40 weight parts,
- Ethyl cellosolve: 80 Weight parts,
- Butanol: 15 weight parts,
- Cellosolve acetate: 50 weight parts, and
- Hardening agent for the resin paint 1161: 15.6 weight parts.

(d) Formation of Pattern 21

Vapor deposition of aluminum and patterning due to photo etching were effected herein. In this case, when the aluminum was vapor-deposited, the light reflectivity of the aluminum surface was viewed from the front side was about 39%, and the light reflectivity of a portion having no aluminum was about 6%. It is of course that these light reflectivities correspond respectively to that of the portion of the pattern 21 and that the portion having no pattern 21.

Example 3:

The light-absorbing layer 50' in the example was formed as follows. Light transmittance was set in accordance with a mixing ratio between a paint A and a paint B, that is, the paint B/(paint A+paint B). In this connection, the characteristic view illustrated in this connection, the characteristic view illustrated in FIG. 4 is an example of the transmittance.

20 weight parts of the paint B were added to 100 weight parts of the paint A. The mixture was sufficiently steered to prepare a black paint for formation of the light-absorbing layer 50'. The black paint was dropped onto the protective substrate 12, was spin-coated at 900 rpm for 30 seconds, and was baked at 120° C. for about one hour. Thus, the light-absorbing layer 50' was obtained which had a film thickness of about 3 μm and in which transmittance is about 66% at the wavelength of 830 nm.

(Composition of Paint A)

- Silicone-acrylate resin paint 1161 (Dainippon Ink & Chemicals, Incorporated) having a solid body of 45%: 40 weight parts,
- Ethyl cellosolve: 15 weight parts,
- Butanol: 15 weight parts,
- Cellosolve acetate: 20 weight parts, and
- Hardening agent for the resin paint 1161: 14 weight parts.

(Composition of Paint B)

- Silicone-acrylate resin paint 1161 (Dainippon Ink & Chemicals, Incorporated) having a solid body of 45%: 40 weight parts,
- Cellosolve acetate: 4 weight parts,
- Vinyl chloride powder in which carbon black was dispersed 30%: 3.6 weight parts,
- Xylene: 16.2 weight parts, and
- Cyclohexanone: 16.2 weight parts.

Industrial Applicability

As described above, this invention makes it possible to read a plurality of types of optical cards different in light reflectivity from each other, by the same reader, and is effective in an attempt at the spread of the optical cards. Particularly, since the ROM optical card having high reflectivity can be read by the reader for the WO optical card, it is possible to broadly spread the ROM optical card.

What is claimed is:

1. An optical card comprised of a protective substrate having a first side and second side which are parallel to each other, the first side of the protective substrate being the side of reading upon which reading light is incident, and an optical data recording section including a light reflective pattern consisting of a metal material or its alloy being arranged on the second side, wherein said protective substrate consists of synthetic resin and a dye or a pigment dissolved or dispersed in the synthetic resin, and wherein the protective substrate per se also comprises a light-absorbing layer, and the light-absorbing layer having light absorbing ability in which the light reflected by the material forming the pattern of said optical data recording section coincides substantially with the light absorbing ability of a pattern forming material of a second optical card having light reflectivity lower than that of the light reflective pattern of the optical card.

2. An optical card comprised of a protective substrate having a first side and second side which are parallel to each other, the first side of the protective substrate being the side of reading upon which reading light is incident, and an optical data recording section including a light reflective pattern consisting of a metal material or its alloy being arranged on the second side, and a light-absorbing layer absorbing the reading light arranged above the first side of the protective substrate, and the light-absorbing layer having light absorbing ability in which the light reflected by the material forming the pattern of said optical data recording section coincides substantially with the light absorbing ability of a pattern forming material of a second optical card having light reflectivity lower than that of the light reflective pattern of the optical card.

3. An optical card according to claim 2, wherein said light-absorbing layer is a coating layer covering the first side of the protective substrate, and consists of synthetic resin and a dye or a pigment dissolved or dispersed in the synthetic resin.

4. An optical card according to claim 3, wherein said lightabsorbing layer is used also as a surface hardening layer.

5. An optical card according to claim 2 or 1, wherein the dye and the pigment impart the ability to absorb light in the range substantially corresponding to infrared light.

6. An optical card according to claim 2, wherein the optical card is a read-only optical card and the second optical card is an additional recording optical card.

7. An optical card according to claim 2, wherein the optical card and the second optical card are each additional recording optical cards.

8. An optical card according to claim 6 or 7, wherein the pattern forming material of the additional recording optical card is capable of being written by a laser, and has the light reflectivity of 35% to 55%.

9. An optical card according to claim 2, wherein both the optical card and the second optical card are read-only optical cards.

10. An optical card according to claim 2, wherein the material forming the pattern of said optical data recording section of the first-mentioned optical card is aluminum or one of its alloys.

11. An optical card according to claim 2, wherein a support substrate is further applied to the second side of said protective substrate, and wherein said optical data recording section is sandwiched between the support substrate and the protective substrate.

12. An optical card comprised of a protective substrate having a first side and second side which are parallel to each other, the first side of the protective substrate being the side of reading upon which reading light is incident, and an optical data recording section including a light reflective pattern consisting of a metal material or its alloy being arranged on the second side, and a light-absorbing layer absorbing the reading light arranged within an anchor layer that is between the protective substrate and the optical data recording section, and the light-absorbing layer having light absorbing ability in which the light reflected by the material forming the pattern of said optical data recording section coincides substantially with the light absorbing ability of a pattern forming material of a second optical card having light reflectivity lower than that of the light reflective pattern of the optical card.

* * * * *